US012632028B2

(12) United States Patent
Imanishi

(10) Patent No.: US 12,632,028 B2
(45) Date of Patent: May 19, 2026

(54) NUMERICAL CONTROL DEVICE AND NUMERICAL CONTROL SYSTEM

(71) Applicant: FANUC CORPORATION, Yamanashi (JP)

(72) Inventor: Kazutaka Imanishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 272 days.

(21) Appl. No.: 18/553,183

(22) PCT Filed: Apr. 23, 2021

(86) PCT No.: PCT/JP2021/016413

§ 371 (c)(1),
(2) Date: Sep. 28, 2023

(87) PCT Pub. No.: WO2022/224425

PCT Pub. Date: Oct. 27, 2022

(65) Prior Publication Data

US 2024/0219885 A1    Jul. 4, 2024

(51) Int. Cl.
B25J 9/16          (2006.01)
G05B 19/18          (2006.01)
(Continued)

(52) U.S. Cl.
CPC .......... G05B 19/404 (2013.01); B25J 9/1607 (2013.01); B25J 9/1633 (2013.01); B25J 9/1638 (2013.01);
(Continued)

(58) Field of Classification Search
CPC ...... B25J 9/1638; B25J 9/1633; B25J 9/1607; G05B 19/41825; G05B 19/41815;
(Continued)

(56) References Cited

U.S. PATENT DOCUMENTS 4,956,594 A * 9/1990 Mizuno .................. B25J 9/1638
                                                                318/632
2010/0211220 A1 * 8/2010 Nishi ............... G05B 19/41825
                                                                700/248

(Continued)

FOREIGN PATENT DOCUMENTS

CN          101791801 A      8/2010
JP          2006-263916 A    10/2006

(Continued)

OTHER PUBLICATIONS

International Search Report issued in PCT/JP2021/016413; mailed Jul. 13, 2021.

Primary Examiner — Khoi H Tran
Assistant Examiner — Tanner L Cullen
(74) Attorney, Agent, or Firm — Studebaker Brackett PLLC

(57) ABSTRACT

A numerical control device is provided that enables switching of a robot payload setting directly from the numerical control device. The device analyzes robot numerical control instructions in a program, generates corresponding robot instruction signals, and selects a payload setting from multiple payload information based on the analyzed instructions. The selected payload setting is transmitted to a robot control device, where it is applied to update payload data used in inverse dynamics torque calculations. By allowing payload settings to be switched and reflected in torque computation, the device improves efficiency and accuracy of robot control under varying payload conditions.

5 Claims, 7 Drawing Sheets

(51) Int. Cl.
  *G05B 19/404*       (2006.01)
  *G05B 19/418*       (2006.01)
(52) U.S. Cl.
  CPC ........ *G05B 19/18* (2013.01); *G05B 19/41825*
  (2013.01); *G05B 2219/36242* (2013.01); *G05B*
  *2219/39188* (2013.01)
(58) Field of Classification Search
  CPC .......... G05B 2219/39001; G05B 2219/50362;
  G05B 2219/36242; G05B 19/4093; G05B
  19/404; G05B 2219/39188
  See application file for complete search history.

(56)                References Cited

U.S. PATENT DOCUMENTS

| | | | |
|---|---|---|---|
| 2016/0327934 | A1 * | 11/2016 | Morimoto .............. B25J 9/1653 |
| 2016/0370786 | A1 | 12/2016 | Nagaoka et al. |
| 2018/0200885 | A1 * | 7/2018 | Ikeda .................... B25J 9/1692 |
| 2018/0333846 | A1 * | 11/2018 | Tarui ...................... B25J 11/005 |
| 2022/0011754 | A1 * | 1/2022 | Sagasaki .......... G05B 19/41835 |
| 2022/0305678 | A1 * | 9/2022 | Talebi ...................... G01G 9/00 |

FOREIGN PATENT DOCUMENTS

| | | | | |
|---|---|---|---|---|
| JP | 5331376 | B2 * | 10/2013 | ............. B65G 43/08 |
| JP | 5752179 | B2 | 7/2015 | |
| JP | 2017-213631 | A | 12/2017 | |

* cited by examiner

FIG. 3

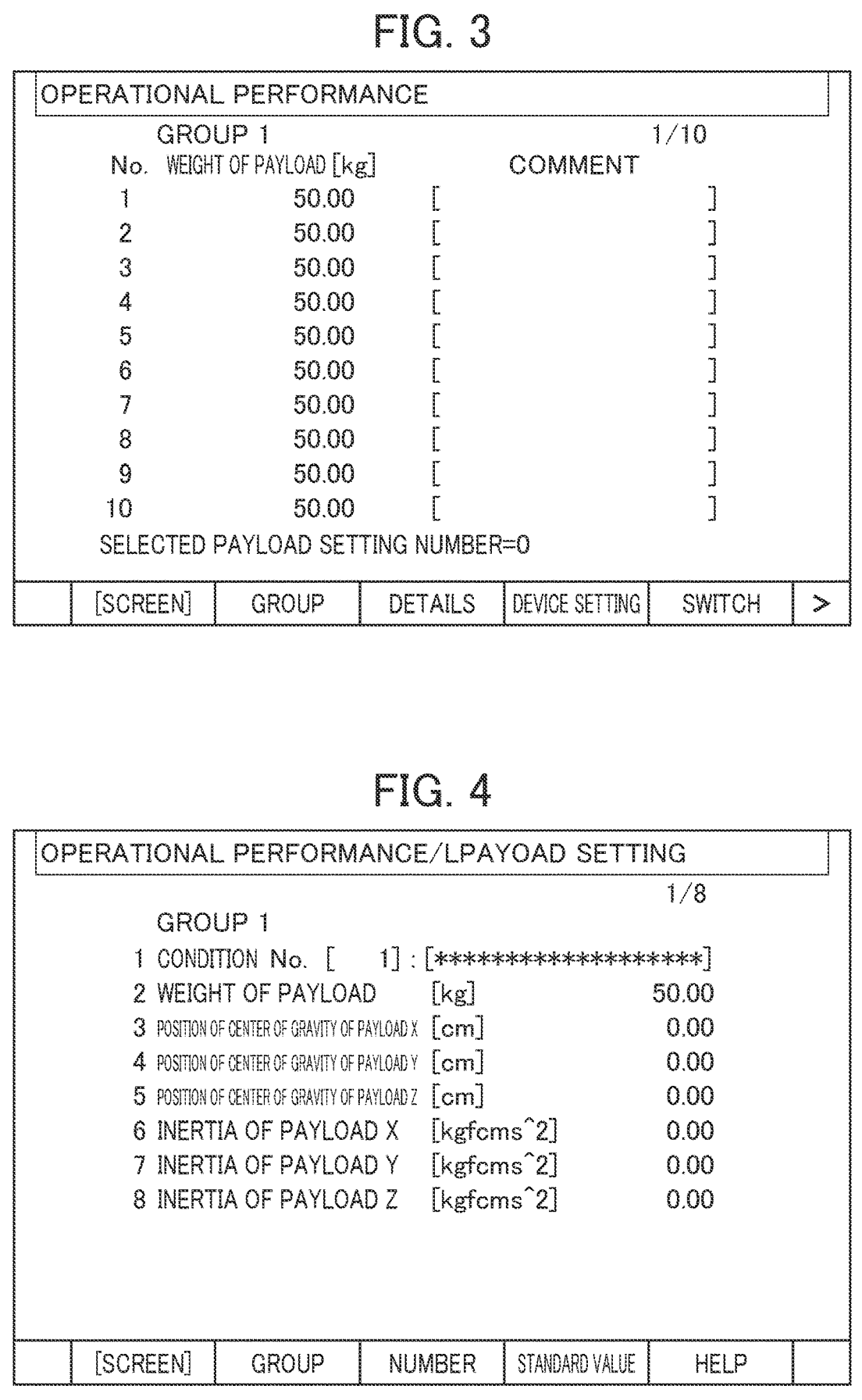

OPERATIONAL PERFORMANCE

GROUP 1                                                         1/10

| No. | WEIGHT OF PAYLOAD [kg] | COMMENT |
|-----|------------------------|---------|
| 1   | 50.00                  | [                    ] |
| 2   | 50.00                  | [                    ] |
| 3   | 50.00                  | [                    ] |
| 4   | 50.00                  | [                    ] |
| 5   | 50.00                  | [                    ] |
| 6   | 50.00                  | [                    ] |
| 7   | 50.00                  | [                    ] |
| 8   | 50.00                  | [                    ] |
| 9   | 50.00                  | [                    ] |
| 10  | 50.00                  | [                    ] |

SELECTED PAYLOAD SETTING NUMBER=0

| [SCREEN] | GROUP | DETAILS | DEVICE SETTING | SWITCH | > |
|----------|-------|---------|----------------|--------|---|

FIG. 4

OPERATIONAL PERFORMANCE/LPAYOAD SETTING

1/8

GROUP 1

1 CONDITION No. [     1] : [******************]
2 WEIGHT OF PAYLOAD        [kg]              50.00
3 POSITION OF CENTER OF GRAVITY OF PAYLOAD X [cm]              0.00
4 POSITION OF CENTER OF GRAVITY OF PAYLOAD Y [cm]              0.00
5 POSITION OF CENTER OF GRAVITY OF PAYLOAD Z [cm]              0.00
6 INERTIA OF PAYLOAD X    [kgfcms^2]         0.00
7 INERTIA OF PAYLOAD Y    [kgfcms^2]         0.00
8 INERTIA OF PAYLOAD Z    [kgfcms^2]         0.00

| [SCREEN] | GROUP | NUMBER | STANDARD VALUE | HELP | |
|----------|-------|--------|----------------|------|--|

FIG. 5

| PAYLOAD SETTING | CORRESPONDING INSTRUCTION |
|---|---|
| No.1 | G100 |
| No.2 | G101 |
| No.3 | G102 |
| No.4 | G103 |
| No.5 | G104 |
| No.6 | G105 |
| No.7 | G106 |
| No.8 | G107 |
| No.9 | G108 |
| No.10 | G109 |

Figure 7:
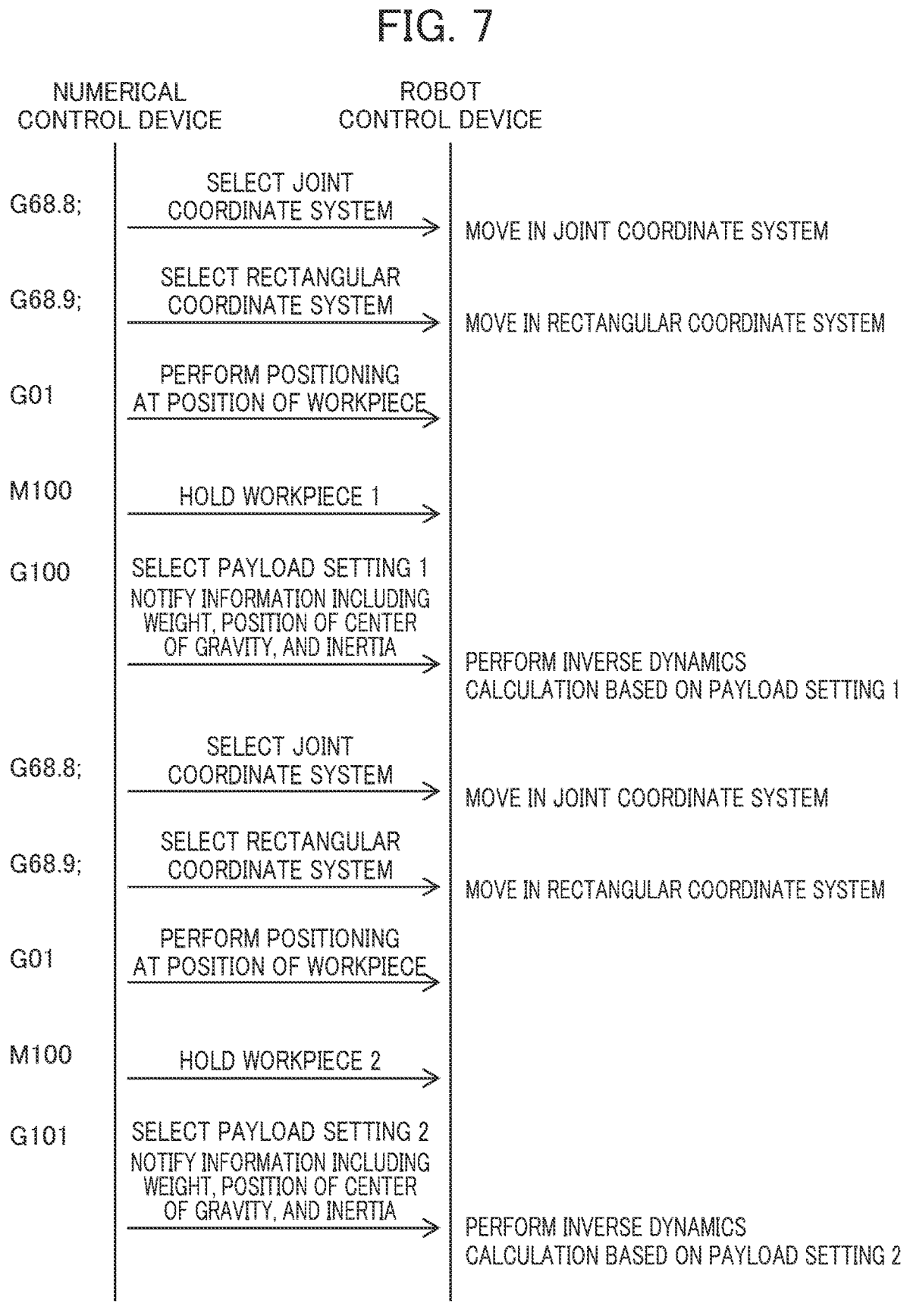

NUMERICAL                          ROBOT
CONTROL DEVICE                 CONTROL DEVICE

G68.8;
SELECT JOINT
COORDINATE SYSTEM
→  MOVE IN JOINT COORDINATE SYSTEM

G68.9;
SELECT RECTANGULAR
COORDINATE SYSTEM
→  MOVE IN RECTANGULAR COORDINATE SYSTEM

G01
PERFORM POSITIONING
AT POSITION OF WORKPIECE
→

M100
HOLD WORKPIECE 1
→

G100
SELECT PAYLOAD SETTING 1
NOTIFY INFORMATION INCLUDING
WEIGHT, POSITION OF CENTER
OF GRAVITY, AND INERTIA
→  PERFORM INVERSE DYNAMICS
CALCULATION BASED ON PAYLOAD SETTING 1

G68.8;
SELECT JOINT
COORDINATE SYSTEM
→  MOVE IN JOINT COORDINATE SYSTEM

G68.9;
SELECT RECTANGULAR
COORDINATE SYSTEM
→  MOVE IN RECTANGULAR COORDINATE SYSTEM

G01
PERFORM POSITIONING
AT POSITION OF WORKPIECE
→

M100
HOLD WORKPIECE 2
→

G101
SELECT PAYLOAD SETTING 2
NOTIFY INFORMATION INCLUDING
WEIGHT, POSITION OF CENTER
OF GRAVITY, AND INERTIA
→  PERFORM INVERSE DYNAMICS
CALCULATION BASED ON PAYLOAD SETTING 2

FIG. 8

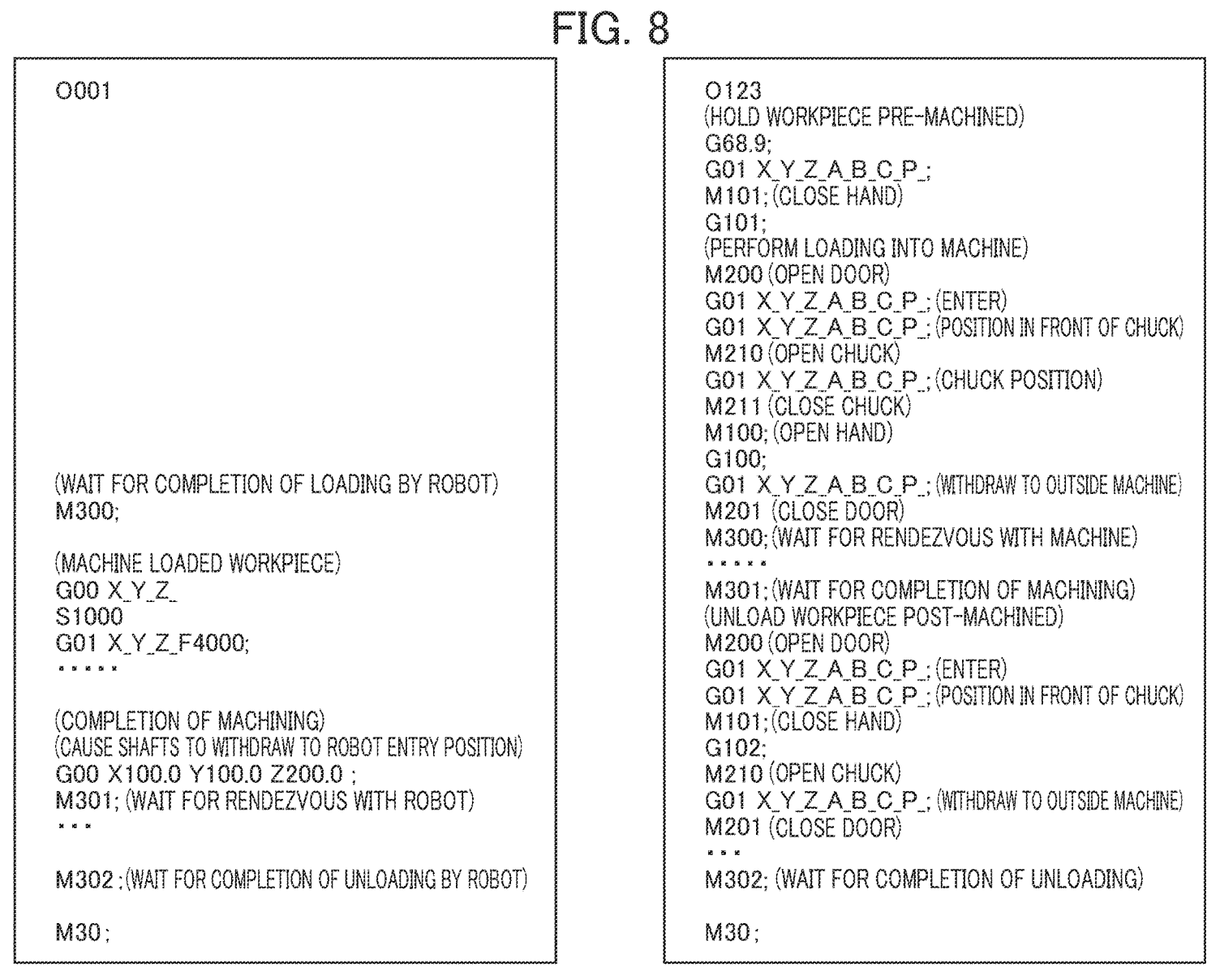

```
O001
(WAIT FOR COMPLETION OF LOADING BY ROBOT)
M300;

(MACHINE LOADED WORKPIECE)
G00 X_Y_Z_
S1000
G01 X_Y_Z_F4000;
......

(COMPLETION OF MACHINING)
(CAUSE SHAFTS TO WITHDRAW TO ROBOT ENTRY POSITION)
G00 X100.0 Y100.0 Z200.0 ;
M301; (WAIT FOR RENDEZVOUS WITH ROBOT)
...

M302 :(WAIT FOR COMPLETION OF UNLOADING BY ROBOT)

M30 ;
```

```
O123
(HOLD WORKPIECE PRE-MACHINED)
G68.9;
G01 X_Y_Z_A_B_C_P_;
M101;(CLOSE HAND)
G101;
(PERFORM LOADING INTO MACHINE)
M200 (OPEN DOOR)
G01 X_Y_Z_A_B_C_P_; (ENTER)
G01 X_Y_Z_A_B_C_P_; (POSITION IN FRONT OF CHUCK)
M210 (OPEN CHUCK)
G01 X_Y_Z_A_B_C_P_; (CHUCK POSITION)
M211 (CLOSE CHUCK)
M100; (OPEN HAND)
G100;
G01 X_Y_Z_A_B_C_P_; (WITHDRAW TO OUTSIDE MACHINE)
M201 (CLOSE DOOR)
M300;(WAIT FOR RENDEZVOUS WITH MACHINE)
......
M301;(WAIT FOR COMPLETION OF MACHINING)
(UNLOAD WORKPIECE POST-MACHINED)
M200 (OPEN DOOR)
G01 X_Y_Z_A_B_C_P_; (ENTER)
G01 X_Y_Z_A_B_C_P_; (POSITION IN FRONT OF CHUCK)
M101;(CLOSE HAND)
G102;
M210 (OPEN CHUCK)
G01 X_Y_Z_A_B_C_P_; (WITHDRAW TO OUTSIDE MACHINE)
M201 (CLOSE DOOR)
...
M302; (WAIT FOR COMPLETION OF UNLOADING)

M30 ;
```

NUMERICAL CONTROL DEVICE AND NUMERICAL CONTROL SYSTEM

TECHNICAL FIELD

The present disclosure relates to a numerical control device and a numerical control system.

BACKGROUND ART

Generally, a numerical control program for controlling a machine tool and a robot program for controlling a robot are written in different programming languages. For this reason, an operator needs to familiarize himself/herself with both the numerical control program and the robot program in order to be able to operate a machine tool and a robot in parallel.

To facilitate automation in work places for machining, such a numerical control system has been demanded in recent years that controls in a linked manner operation of a machine tool that machines a workpiece and operation of a robot provided in proximity to the machine tool (for example, see Patent Document 1). In this numerical control system, a user of a machine tool, who has been familiarized with a numerical control program for the machine tool, uses such a numerical control program to control a robot.

Patent Document 1: Japanese Patent No. 5752179

DISCLOSURE OF THE INVENTION

Problems to be Solved by the Invention

By the way, such a technology has been known that uses a robot to perform some arrangements when a workpiece to be machined is changed. In this technology, payload settings such as the weights of payloads, the positions of the centers of gravity, and inertia values are stored in a robot control device. When controlling each joint angle in accordance with a path plan, an inverse dynamics calculation (based on the Newton-Euler method, for example) is performed to calculate torque necessary for achieving an angle of each of joints of a robot, an angular velocity, and angular acceleration driving. The calculated torque is then successively inputted into a motor of each of the joints as instruction torque. Thereby, negative effects by a payload are compensated, minimizing an operation cycle time of the robot.

However, it is necessary to statically set beforehand such payload settings for the robot in a robot program. That is, it has been impossible to rewrite the robot program from the numerical control device and impossible to change the payload settings for the robot from the numerical control device. Therefore, there has been such a disadvantage that, when a workpiece is changed, it is impossible to minimize an operation cycle time of the robot.

An object of the present disclosure is to provide a numerical control device and a numerical control system in which it is possible to switch a payload setting for a robot to another payload setting from a numerical control device.

Means for Solving the Problems

An aspect of the present disclosure is directed to a numerical control device including: an analysis unit that analyzes a robot numerical control instruction in a numerical control program; a robot instruction signal generation unit that generates a robot instruction signal to be transmitted to a robot control device in accordance with the robot numerical control instruction analyzed by the analysis unit; a payload setting selection unit that selects a payload setting to be set for a robot from among a plurality of pieces of payload information in accordance with the robot numerical control instruction analyzed by the analysis unit; and a transmission unit that transmits the payload setting selected by the payload setting selection unit to a payload setting update control unit of the robot control device via the robot instruction signal generation unit and thereby reflects the payload setting in an inverse dynamics calculation for torque to be inputted into the robot.

Effects of the Invention

According to the present disclosure, it is possible to provide a numerical control device and a numerical control system in which it is possible to switch a payload setting for a robot to another payload setting from a numerical control device.

BRIEF DESCRIPTION OF THE DRAWINGS

FIG. 3 is a diagram illustrating an example of pieces of payload information;

FIG. 4 is a diagram illustrating an example of pieces of payload information;

FIG. 5 is a diagram illustrating numerical control instructions that are set to correspond to payload settings;

FIG. 6 is a diagram illustrating a robot numerical control program;

FIG. 7 is a sequence diagram illustrating flows of signals and pieces of information between the numerical control device and the robot control device according to the embodiment of the present disclosure; and FIG. 8 is a diagram illustrating a machine tool numerical control program and a robot numerical control program.

PREFERRED MODE FOR CARRYING OUT THE INVENTION

An embodiment of the present disclosure will now be described herein in detail with reference to the accompanying drawings.

Figure 1:
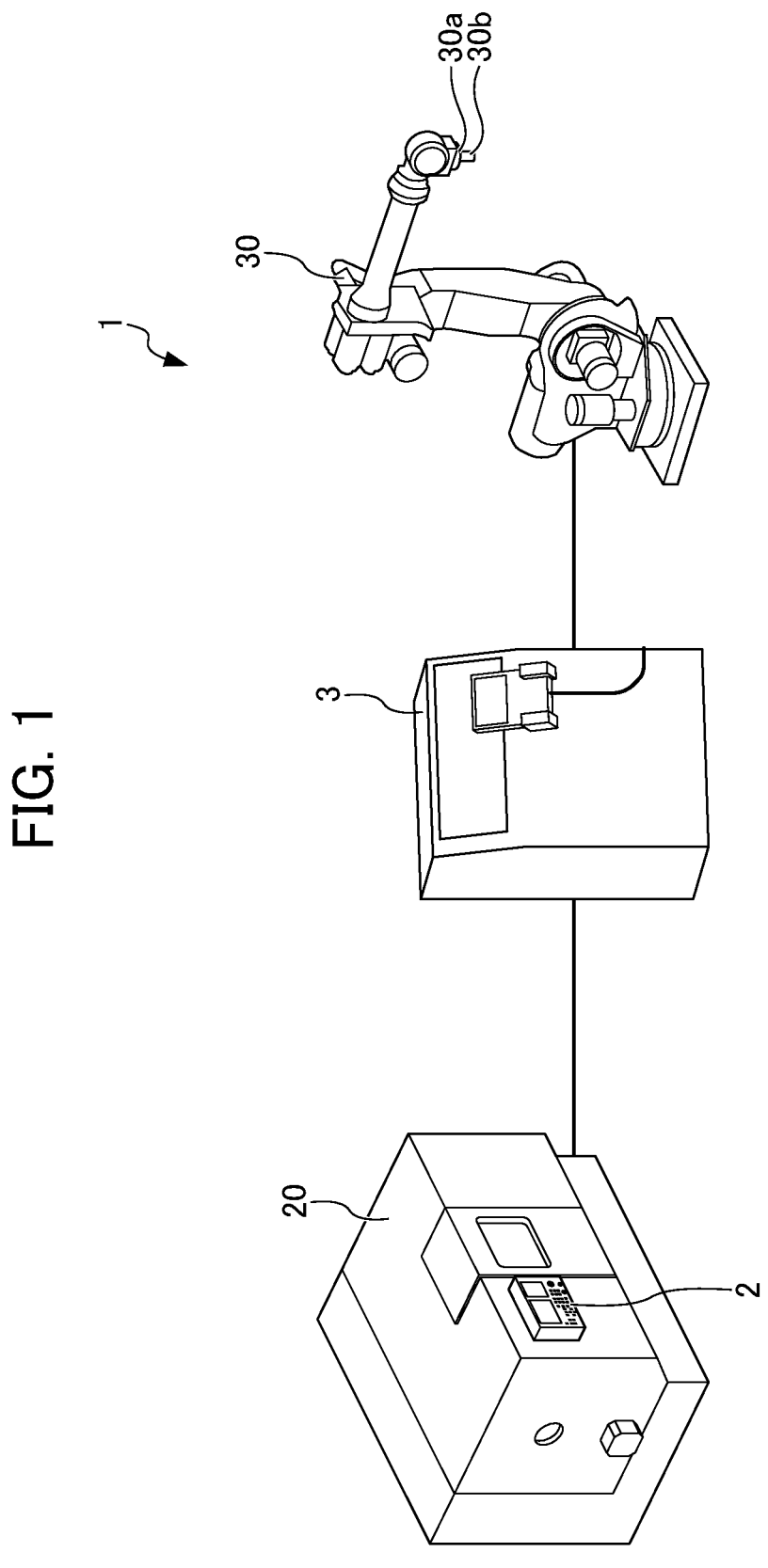
FIG. 1 is a schematic diagram of a numerical control system according to an embodiment of the present disclosure.

FIG. 1 is a schematic diagram of a numerical control system 1 according to the embodiment of the present disclosure.

The numerical control system 1 includes a numerical control device (computer numerical controller or CNC) 2 that controls a machine tool 20 and a robot control device 3 that is communicably coupled to the numerical control device 2 and that controls a robot 30 provided in proximity to the machine tool 20. The numerical control system 1 according to the present embodiment uses the numerical control device 2 and the robot control device 3 communicably coupled to each other to control in a linked manner operation of the machine tool 20 and operation of the robot 30.

The numerical control device 2 follows a predetermined numerical control program to generate a machine tool instruction signal serving as an instruction to the machine tool 20 and a robot instruction signal serving as an instruction to the robot 30. The numerical control device 2 then transmits the generated machine tool instruction signal and the generated robot instruction signal respectively to the machine tool 20 and the robot control device 3. The robot control device 3 controls operation of the robot 30 in accordance with the robot instruction signal transmitted from the numerical control device 2.

The machine tool 20 machines a non-illustrated workpiece in accordance with the machine tool instruction signal transmitted from the numerical control device 2. The machine tool 20 is, but not limited to, a lathe, a drilling machine, a milling machine, a grinding machine, a laser processing machine, or an injection molding machine, for example.

The robot 30 operates under the control by the robot control device 3 to execute a predetermined task on the workpiece to be machined inside the machine tool 20 that is a lathe, for example. The robot 30 is an articulated robot, for example, and has an arm tip portion 30a attached with a tool 30b for holding, for machining, or for inspecting the workpiece. An example to be described below corresponds to, but not limited to, a case when the robot 30 is a six-axis articulated robot. Furthermore, although the example to be described below corresponds to the case when the robot 30 is the six-axis articulated robot, the number of axes is not limited to six.

Figure 2:
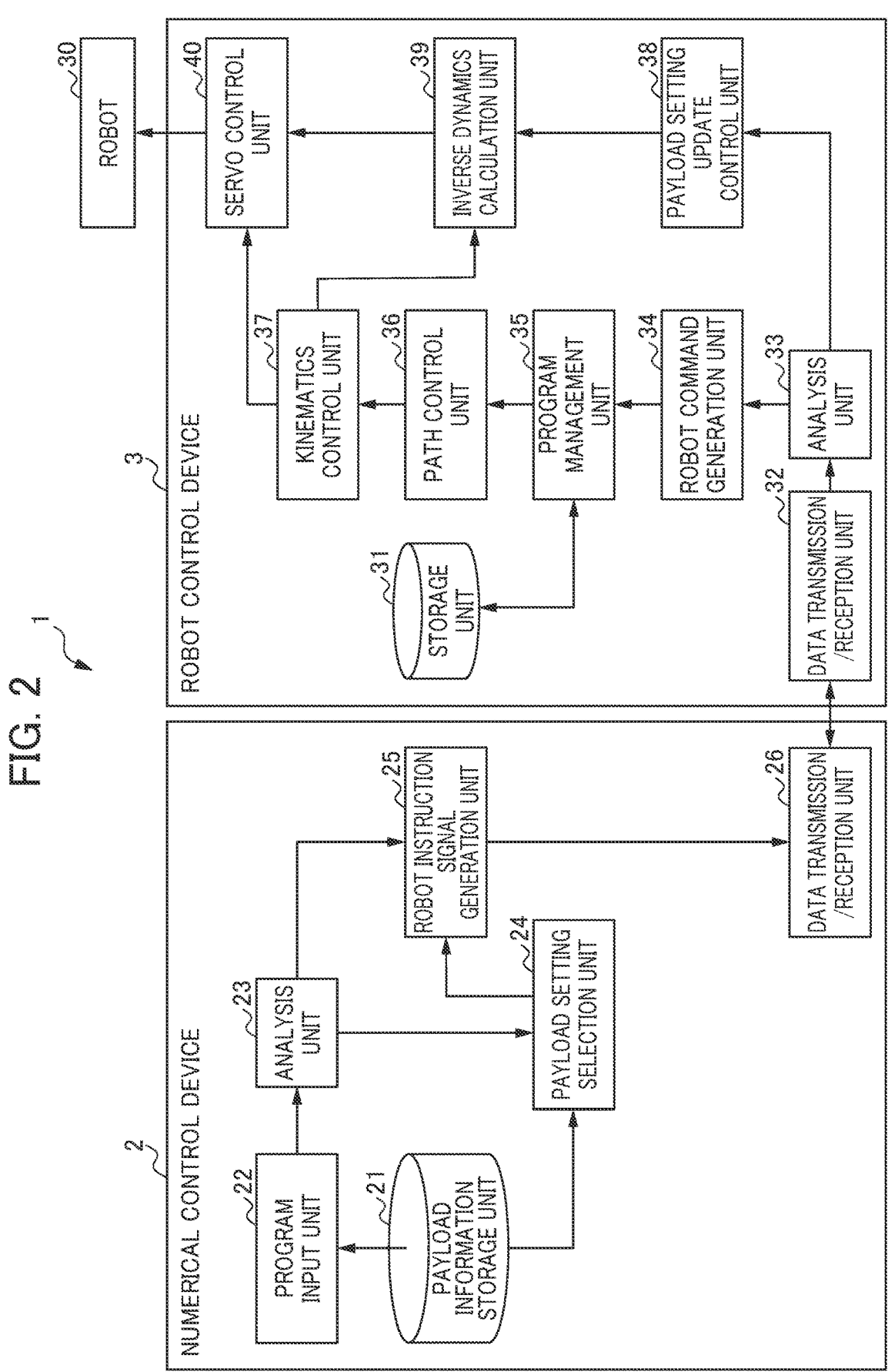
FIG. 2 is a functional block diagram of a numerical control device and a robot control device according to the embodiment of the present disclosure.

FIG. 2 is a functional block diagram of the numerical control device 2 and the robot control device 3 according to the embodiment of the present disclosure.

The numerical control device 2 and the robot control device 3 respectively are computers that each include hardware such as arithmetic processing means such as a central processing unit (CPU), auxiliary storage means such as a hard disk drive (HDD) or a solid state drive (SSD) that stores various kinds of computer programs, main storage means such as a random access memory (RAM) that stores data that the arithmetic processing means temporarily requires to execute the computer programs, operation means such as a keyboard with which an operator performs various kinds of operation, and display means such as a display that displays various kinds of information to the operator. The numerical control device 2 and the robot control device 3 are able to mutually transmit and receive various kinds of signals via an Ethernet (registered trademark), for example.

A detailed configuration of the numerical control device 2 will first be described. In the numerical control device 2, the hardware configuration described above is applied to achieve a machine tool control function that controls operation of the machine tool 20 and a function that generates a robot instruction signal for controlling control shafts of the robot 30. Specifically, to achieve these functions, the numerical control device 2 includes, but is not limited to, a payload information storage unit 21, a program input unit 22, an analysis unit 23, a payload setting selection unit 24, a robot instruction signal generation unit 25, and a data transmission/reception unit 26.

The payload information storage unit 21 stores pieces of payload information including, but not limited to, the weights of various kinds of payloads, the positions of the centers of gravity, and inertia relating to the robot 30. These pieces of payload information are inputted beforehand by the operator and stored in the payload information storage unit 21.

Note herein that FIGS. 3 and 4 are diagrams illustrating examples of pieces of payload information. These pieces of payload information are displayed on a display screen of the numerical control device 2. As illustrated in FIG. 3, for example, a group of a plurality of payloads each having a weight of 50 kg are numbered and stored in the payload information storage unit 21. FIG. 4 illustrates the contents of Group 1, which are displayed when Group 1 illustrated in FIG. 3 is selected. In the contents, the positions of the centers of gravity of payloads and inertia values of the payloads are stored. As described above, a weight, the position of the center of gravity, and inertia are linked to each other per payload and stored in the payload information storage unit 21.

Returning to FIG. 2, each of the plurality of pieces of payload information stored in the payload information storage unit 21 is selected as a payload setting to be set for the robot 30 by the payload setting selection unit 24 described later. That is, a payload setting for the robot 30 is set based on pieces of payload information including, but not limited to, the weight of a payload, the position of the center of gravity of the payload, and inertia of the payload.

The payload information storage unit 21 stores such pieces of payload information described above in accordance with a workpiece. A payload setting for the robot 30 is set in accordance with each workpiece. Furthermore, the payload information storage unit 21 stores pieces of payload information about a workpiece pre-machined and post-machined, that is, a workpiece pre-machined and post-machined, in which there are changes in its weight, the position of the center of gravity, and inertia due to machining. A payload setting for the robot 30 is then set in accordance with such a workpiece pre-machined and post-machined.

Note that the numerical control device 2 according to the present embodiment further includes, in addition to the payload information storage unit 21, a program storage unit, a machine coordinate value storage unit, a robot coordinate value storage unit, and a robot teaching position storage unit, which are not shown in the drawings.

The program storage unit stores a plurality of numerical control programs calculated based on various kinds of operation by the operator, for example. More specifically, the program storage unit stores a plurality of instruction blocks for the machine tool 20 for controlling operation of the machine tool 20 and numerical control programs including a plurality of instruction blocks and other elements for the robot 30 for controlling operation of the robot 30. The numerical control programs stored in the program storage unit are written in known programming languages for controlling operation of the machine tool such as G code and M code.

The machine coordinate value storage unit stores machine coordinate values that indicate positions of various kinds of shafts of the machine tool 20 that operates under the numerical control programs described above (i.e., positions of a cutter holder and a table for the machine tool 20, for example). Note that the machine coordinate values are defined under a machine tool coordinate system in which a reference point specified at a desired position on the machine tool or in proximity to the machine tool 20 serves as its origin. The machine coordinate values that change successively under the numerical control programs are updated successively through non-illustrated processing for storing the latest values in the machine coordinate value storage unit.

The robot coordinate value storage unit stores a position and a posture of a control point (for example, the arm tip portion 30a of the robot 30) of the robot 30 that operates under the control by the robot control device 3, in other words, robot coordinate values that indicate positions of the control shafts of the robot 30. Note that these robot coordinate values are defined under a robot coordinate system that differs from the machine tool coordinate system, as described above. The robot coordinate values that change successively under the numerical control programs are updated successively with the robot coordinate values acquired from the robot control device 3 through non-illustrated processing for storing the latest values in the robot coordinate value storage unit.

The robot teaching position storage unit stores teaching positions such as a start point and an end point for the robot 30, which are inputted by the operator, specifically, teaching positions for the robot 30, which are inputted from a teach pendant, or teaching positions inputted from a keyboard, for example. Such teaching positions for the robot 30 include robot coordinate values indicating the positions of the control shafts of the robot 30. These robot coordinate values are defined under the robot coordinate system that differs from the machine tool coordinate system.

Note herein that the robot coordinate system is a coordinate system in which a reference point specified at a desired position on the robot 30 or in proximity to the robot 30 serves as its origin. A case where the robot coordinate system differs from the machine tool coordinate system will be described below. However, the present disclosure is not limited to this case. The robot coordinate system and the machine tool coordinate system may coincide with each other. In other words, the origin and the directions of the coordinate axes of the robot coordinate system and the origin and the directions of the coordinate axes of the machine tool coordinate system may coincide with each other.

Furthermore, in the robot coordinate system, the control shafts are switchable among two or more different coordinate formats. More specifically, in a numerical control program, the position and the posture of the control point of the robot 30 are specifiable with an orthogonal coordinate format or a joint coordinate format.

In the joint coordinate format, the position and the posture of the control point of the robot 30 are specified with coordinate values of a total of six real numbers that include rotation angle values (J1, J2, J3, J4, J5, and J6) of the six joints of the robot 30 as components.

In the orthogonal coordinate format, the position and the posture of the control point of the robot 30 are specified with coordinate values of a total of six real numbers that include three coordinate values (X, Y, and Z) respectively along three orthogonal coordinate axes and three rotation angle values (A, B, and C) respectively around the orthogonal coordinate axes as components.

Since the rotation angles of the joints of the robot 30 are directly specified under the joint coordinate format, the axis arrangement of arms and a wrist of the robot 30 and rotation numbers of the joints that are rotatable each at an angle of 360 degrees or more (hereinafter they are collectively referred to as "configuration of the robot 30") are also uniquely defined. On the other hand, under the orthogonal coordinate format, it is impossible to uniquely define the configuration of the robot 30 since the position and the posture of the control point of the robot 30 are specified by the six coordinate values (X, Y, Z, A, B, and C). Then, in a numerical control program for a robot, it is possible to specify the configuration of the robot 30 with a configuration value P that is an integer value having a predetermined number of digits. Therefore, the position and the posture of the control point of the robot 30 and the configuration of the robot 30 are represented by six coordinate values (J1, J2, J3, J4, J5, and J6) under the joint coordinate format and by six coordinate values and one configuration value (X, Y, Z, A, B, C, and P) under the orthogonal coordinate format.

The program input unit 22 reads the numerical control programs from the program storage unit and inputs successively the read numerical control programs into the analysis unit 23. Furthermore, the program input unit 22 reads pieces of payload information for the robot 30, which are stored in the payload information storage unit 21, and inputs the read pieces of payload information into the analysis unit 23.

The analysis unit 23 performs an analysis for an instruction type per an instruction block based on each of the numerical control programs inputted from the program input unit 22 and outputs a result of the analysis to a non-illustrated machine tool control unit and the robot instruction signal generation unit 25 described later. More specifically, the analysis unit 23 transmits an instruction, when an instruction type of its instruction block is for the machine tool 20, to the machine tool control unit and outputs an instruction, when an instruction type of its instruction block is for the robot 30, to the robot instruction signal generation unit 25.

The non-illustrated machine tool control unit generates a machine tool control signal for controlling operation of the machine tool 20 in accordance with a result of the analysis transmitted from the analysis unit 23, and inputs the generated machine tool control signal to actuators that drive the various kinds of shafts of the machine tool 20. The machine tool 20 operates in accordance with the machine tool control signal inputted from the machine tool control unit to machine the non-illustrated workpiece. Furthermore, after controlling operation of the machine tool 20 in accordance with the numerical control program as described above, the machine tool control unit updates the machine coordinate value stored in the machine coordinate value storage unit with the latest machine coordinate value.

Furthermore, the analysis unit 23 according to the present embodiment performs an analysis for an instruction type per an instruction block based on a numerical control program inputted from the program input unit 22. The analysis unit 23 then determines whether or not the instruction type corresponds to a selection instruction for a payload setting for the robot 30. When it is determined that the instruction type corresponds to a selection instruction for a payload setting for the robot 30 as a result of the analysis, the analysis unit 23 notifies a result of the determination to the payload setting selection unit 24 described later.

Note herein that FIG. 5 is a diagram illustrating numerical control instructions that are set to correspond to payload settings. In a numerical control program according to the present embodiment, a numerical control instruction corresponding to each payload setting is specified as a G code, as illustrated in FIG. 5. For example, No. 1 illustrated in FIG. 5 indicates a piece of payload setting information corresponding to Group 1 illustrated in FIGS. 3 and 4 and is specified as G100. As described above, a G code is set per a payload setting. When one of these G codes is detected, the analysis unit 23 determines that its instruction type corresponds to a selection instruction for a payload setting for the robot 30.

Now back to FIG. 2. The payload setting selection unit 24 reads one of the pieces of payload information for the robot 30, which are stored in the payload information storage unit 21 described above, in accordance with the notification of the result of the determination from the analysis unit 23 described above. Specifically, the payload setting selection unit 24 reads a piece of payload information corresponding to the selection instruction from among the plurality of pieces of payload information stored in the payload information storage unit 21 based on the selection instruction for a payload setting for the robot 30, which is determined by the analysis unit 23. The payload setting selection unit 24 then selects the piece of payload information as a payload setting to be set for the robot 30. Note that the payload setting selection unit 24 notifies the selected payload setting to the robot instruction signal generation unit 25 described later.

For the robot program for which it is analyzed by the analysis unit 23 that an instruction type of its instruction block corresponds to an instruction for the robot 30, among the programs stored in the program storage unit, the robot instruction signal generation unit 25 generates a robot instruction signal in accordance with the robot program. A robot instruction signal to be generated includes a robot program start instruction serving as a trigger for starting one of the robot programs stored in a storage unit 31 that is present on a side of the robot control device 3. The robot instruction signal generation unit 25 outputs the generated robot instruction signal to the data transmission/reception unit 26.

Furthermore, when the payload setting selected by the payload setting selection unit 24 described above is notified, the robot instruction signal generation unit 25 according to the present embodiment generates a payload setting update instruction signal instructing performing an update with the payload setting. The robot instruction signal generation unit 25 outputs the generated payload setting update instruction signal to the data transmission/reception unit 26 described later.

The data transmission/reception unit 26 mutually transmits and receives various kinds of instructions and various kinds of data to and from a data transmission/reception unit 32 of the robot control device 3. When a robot instruction signal is written by the robot instruction signal generation unit 25, the data transmission/reception unit 26 outputs the robot instruction signal to the data transmission/reception unit 32 of the robot control device 3.

Furthermore, the data transmission/reception unit 26 according to the present embodiment transmits the payload setting update instruction signal outputted from the robot instruction signal generation unit 25 described above to the robot control device 3 described later. That is, the data transmission/reception unit 26 transmits the payload setting selected by the payload setting selection unit 24 described above to the robot control device 3 via the robot instruction signal generation unit 25. The payload setting transmitted to the robot control device 3 is utilized, upon notification to the payload setting update control unit 38 described later, for an inverse dynamics calculation for torque to be inputted to the robot 30.

Next, the configuration of the robot control device 3 will be described in detail. For controlling operation of the robot 30 based on an instruction transmitted from the numerical control device 2, the robot control device 3 includes, but is not limited to, as illustrated in FIG. 2, the storage unit 31, the data transmission/reception unit 32, an analysis unit 33, a robot command generation unit 34, a program management unit 35, a path control unit 36, a kinematics control unit 37, a payload setting update control unit 38, an inverse dynamics calculation unit 39, and a servo control unit 40.

The data transmission/reception unit 32 receives robot instruction signals transmitted from the data transmission/reception unit 26 of the numerical control device 2. The data transmission/reception unit 32 successively outputs the received robot instruction signals to the analysis unit 33.

Furthermore, the data transmission/reception unit 32 according to the present embodiment receives a payload setting selected by the payload setting selection unit 24 described above and transmitted from the data transmission/reception unit 26 of the numerical control device 2. The received payload setting is notified to the analysis unit 33 described later.

The analysis unit 33 analyzes the robot instruction signals inputted from the data transmission/reception unit 32. The analysis unit 33 outputs a result of the analysis to the robot command generation unit 34 described later.

Furthermore, the analysis unit 33 according to the present embodiment notifies, when a payload setting update instruction is detected, pieces of payload setting information to the payload setting update control unit 38 described later.

The payload setting update control unit 38 executes, when the payload setting update instruction is detected and the pieces of payload setting information are notified by the analysis unit 33 described above, an update to the notified payload setting. Furthermore, the payload setting update control unit 38 notifies the updated payload setting to the inverse dynamics calculation unit 39 described later.

The inverse dynamics calculation unit 39 performs an inverse dynamics calculation to calculate torque to be inputted to the robot 30 based on the payload setting updated and notified by the payload setting update control unit 38 described above. The inverse dynamics calculation unit 39 outputs the torque acquired through the calculation to the servo control unit 40 described later.

Note herein that the inverse dynamics calculation for the robot 30 refers to a method of calculating input torque to each motor by taking into account a tip payload, a gravitational force, and its own weight applied to the robot 30 based on a desired movement calculated from a motion path plan for the robot 30 (time-series data on a position, a speed, and a degree of acceleration at each of the joints) to achieve such a response. As those that relate to the inverse dynamics calculation as described above, various kinds of numerical calculation methods such as the computed torque method and the Newton-Euler method are disclosed (for example, see Japanese Unexamined Patent Application Publication No. H8-118275 and Japanese Unexamined Patent Application Publication No. 2015-58520).

The robot command generation unit 34 generates, based on the result of the analysis on the robot instruction signals inputted from the analysis unit 33, robot commands in accordance with the robot instruction signals. The robot command generation unit 34 outputs the generated robot commands to the program management unit 35.

The program management unit 35 successively executes the robot commands, when they are inputted from the robot command generation unit 34, generates a motion plan for the robot 30 in accordance with the robot instruction signals described above, and outputs the generated motion plan to the path control unit 36.

Furthermore, the program management unit 35 adds, when a robot command inputted from the robot command generation unit 34 is a block robot command, the inputted block robot command to the robot program stored in the storage unit 31. Thereby, a robot program is generated in accordance with the robot instruction signals transmitted from the numerical control device 2 and is stored in the storage unit 31. The stored robot program is started and played as the program management unit 35 receives a robot program start instruction as a robot command.

The path control unit 36 calculates, when the motion plan is inputted from the program management unit 35, time-series data on the control point of the robot 30, and outputs the calculated time-series data to the kinematics control unit 37.

The kinematics control unit 37 calculates a target angle for each of the joints of the robot 30 through an inverse kinematics calculation based on the inputted time-series data, and outputs the calculated target angle to the servo control unit 40. Note herein that the inverse kinematics calculation for the robot 30 refers to a method of calculating an angle of each of the joints from a position and a posture of the tip of the robot 30.

The servo control unit 40 performs feedback control for servo motors of the robot 30 to achieve the target angles inputted from the kinematics control unit 37 to generate robot control signals for the robot 30 and inputs the generated robot control signals to the servo motors of the robot 30.

Furthermore, the servo control unit 40 according to the present embodiment generates robot control signals in which the torque calculated by the inverse dynamics calculation unit 39 described above is reflected. Thereby, it is possible to control the robot 30 based on the updated payload setting.

Next, how various kinds of signals and various pieces of information flow in the numerical control system 1 configured as described above will be described with reference to FIGS. 6 and 7. Specifically, a flow of switching to a payload setting that is set in accordance with a workpiece will be described.

Figure 6:
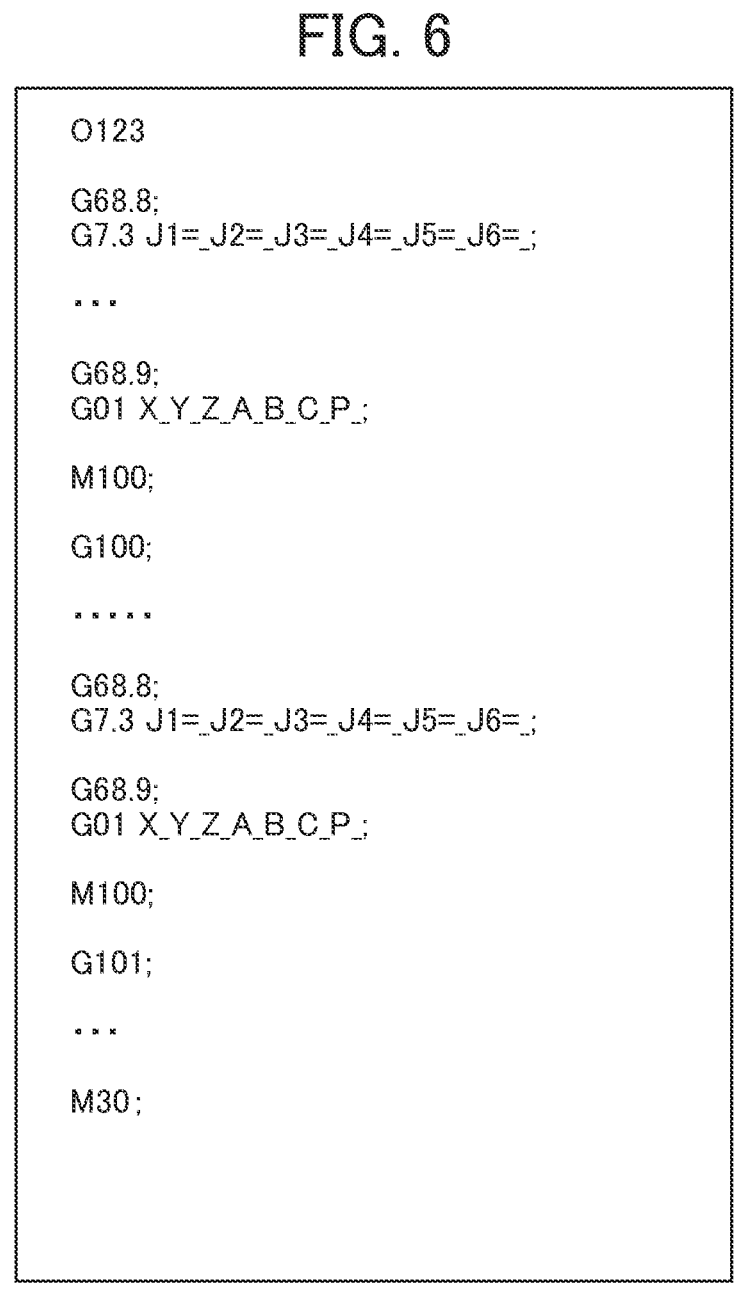

FIG. 6 is a diagram illustrating a robot numerical control program. FIG. 7 is a sequence diagram illustrating flows of signals and pieces of information between the numerical control device 2 and the robot control device 3 according to the present embodiment.

Since a position of the robot 30 is unknown at first, "G68.8" is first inputted and a joint coordinate system for which it is not necessary to take into account kinematics is selected. When it is instructed with "G7.3 J1=_J2=_J3=_J4=_J5=_J6=_", the robot control device 3 positions the robot 30 at the specified position in the joint coordinate system. Note that coordinate values of the specified position for the robot 30 are inputted to the spaces with the underbars in the command.

Next, it is instructed with "G68.9" and the rectangular coordinate system is selected. When it is instructed with "G01 X_Y_Z_A_B_C_P_", the robot control device 3 causes and positions the robot 30 to move straight forward toward and at the specified position (the position of the workpiece) in the rectangular coordinate system. Note that coordinate values of the specified position for the robot 30 are inputted to the spaces with the underbars in the command.

Next, when it is instructed with "M100" and the robot control device 3 causes the hand of the robot 30 to close, a workpiece 1 is held. After that, when it is instructed with G code "G100" described above, a payload setting 1 that is stored beforehand in the payload information storage unit 21 and that corresponds to the workpiece 1 being held is selected. The selected payload setting 1 is transmitted to the side of the robot control device 3. The payload setting update control unit 38 then updates the payload setting that has been set so far with the newly notified payload setting 1. The inverse dynamics calculation unit 39 then performs an inverse dynamics calculation based on the updated payload setting 1. The robot 30 is then controlled in accordance with a robot control instruction in which the calculated input torque is reflected.

Next, switching from the payload setting 1 to a payload setting 2 is executed. It is first instructed with "G68.8" and the joint coordinate system is selected. When it is instructed with "G7.3 J1=J2=J3=J4=J5=J6=", the robot control device 3 positions the robot 30 at the specified position in the joint coordinate system.

Next, it is instructed with "G68.9" and the rectangular coordinate system is selected. When it is instructed with "G01 X_Y_Z_A_B_C_P_", the robot control device 3 causes and positions the robot 30 to move straight forward toward and at the specified position (the position of the workpiece) in the rectangular coordinate system.

Next, when it is instructed with "M100" and the robot control device 3 causes the hand of the robot 30 to close, a workpiece 2 is held. After that, when it is instructed with "G101", the payload setting 2 that is stored beforehand in the payload information storage unit 21 and that corresponds to the workpiece 2 being held is selected. The selected payload setting 2 is transmitted to the side of the robot control device 3. The payload setting update control unit 38 then updates the payload setting 1 that has been set so far with the newly notified payload setting 2. The inverse dynamics calculation unit 39 then performs an inverse dynamics calculation based on the updated payload setting 2. The robot 30 is then controlled in accordance with a robot control instruction in which the calculated input torque is reflected.

In the numerical control system 1 according to the present embodiment, as described above, it is possible to perform switching to a payload setting for the robot 30 in accordance with a workpiece under a numerical control instruction transmitted from a side of the numerical control device 2.

Next, a flow of switching to a payload setting that is set in accordance with a workpiece pre-machined and post-machined will be described with reference to FIG. 8.

FIG. 8 is a diagram illustrating a machine tool numerical control program and a robot numerical control program. FIG. 8 illustrates, in parallel to each other, the machine tool numerical control program on the left side and the robot numerical control program corresponding to the machine tool numerical control program on the right side.

When it is sequentially instructed with "G68.9", "G01 X_Y_Z_A_B_C_P", "M101", and "G101" in the robot numerical control program, the robot control device 3 first causes and positions the robot 30 to move straight forward toward and at the specified position (the position of the workpiece) in the rectangular coordinate system, and then causes the hand of the robot 30 to close, the workpiece 1 is held. The payload setting for the robot 30 is thus switched to the payload setting 2 (the workpiece 1 pre-machined).

Next, when it is sequentially instructed with "M200 (open door)", "G01 X_Y_Z_A_B_C_P; (enter)", "G01 X_Y_Z_A_B_C_P; (position in front of chuck)", "M210 (open chuck)", "G01 X_Y_Z_A_B_C_P_; (chuck position)", "M211 (close chuck)", "M100 (open hand)", and "G100" in the robot numerical control program, the workpiece 1 is loaded into the machine tool 20. After the workpiece 1 is loaded, the payload setting for the robot 30 is switched to the payload setting 1 (no payload).

After that, "G01 X_Y_Z_A_B_C_P; (withdraw to outside machine)" and "M201 (close door)" are sequentially inputted in the robot numerical control program, causing the robot 30 to withdraw to outside the machine tool 20. At this time, it is instructed with "M300" in the machine tool numerical control program, executing waiting for the completion of loading by the robot 30. It is further instructed with "M300"

in the robot numerical control program, executing waiting for a rendezvous with the machine tool 20.

Next, it is sequentially instructed with "G00 X_Y_Z_", "S1000" and "G01 X_Y_Z_F4000" in the machine tool numerical control program, executing machining on the loaded workpiece 1. After the machining is completed, it is sequentially instructed with "G00 X_Y_Z_", "M301", "M302", and "M30", causing the shafts to withdraw to the robot entry position, executing waiting for a rendezvous with the robot 30 and waiting for the completion of unloading. The program then ends.

On the other hand, it is instructed with "M301" in the robot numerical control program, executing waiting for the completion of machining. After the machining is completed, it is sequentially instructed with "M200 (open door)", "G01 X_Y_Z_A_B_C_P_; (enter)", "G01 X_Y_Z_A_B_C_P; (chuck position)", "M101 (close hand)", and "G102", the workpiece 1 post-machined is unloaded. The payload setting for the robot 30 is then switched to a payload setting 3 (the workpiece 1 post-machined). After that, it is sequentially instructed with "M210 (open chuck)", "G01 X_Y_Z_A_B_C_P_; (withdraw to outside machine)", "M201 (close door)", "M302", and "M30". The program then ends.

In the numerical control system 1 according to the present embodiment, as described above, it is possible to perform switching to a payload setting for the robot 30 in accordance with a workpiece pre-machined and post-machined under a numerical control instruction transmitted from the side of the numerical control device 2.

According to the present embodiment, it is possible to achieve effects described below.

The numerical control device 2 according to the present embodiment includes the payload setting selection unit 24 that selects a payload setting to be set to the robot 30 from among a plurality of pieces of payload information in accordance with a robot numerical control instruction analyzed by the analysis unit 23. Furthermore, the numerical control device 2 according to the present embodiment includes the data transmission/reception unit 26 that transmits the payload setting selected by the payload setting selection unit 24 to the payload setting update control unit 38 of the robot control device 3 via the robot instruction signal generation unit 25 and thereby reflects the payload setting in an inverse dynamics calculation for torque to be inputted into the robot 30.

Thereby, it is possible to dynamically change a payload setting for the robot 30 from a numerical control program. It is thus possible to automatically switch a payload setting for the robot 30 from the numerical control device 2. Even when a workpiece is changed while a program for the machine tool 20 is running, it is therefore possible to automatically switch a payload setting for the robot 30 from the numerical control device 2. It is thus possible to minimize an operation cycle time of the robot 30.

Furthermore, the numerical control device 2 according to the present embodiment has a configuration where a payload setting is set based on pieces of payload information including the weight of a payload, the position of the center of gravity of the payload, and inertia of the payload. Furthermore, such a configuration has been applied that it is possible to set a payload setting in accordance with a workpiece. It is also possible to set a payload setting in accordance with a workpiece pre-machined and post-machined. Thereby, it is possible to achieve a more optimum payload setting. It is thus possible to more securely minimize an operation cycle time of the robot 30.

Furthermore, with the numerical control system 1 according to the present embodiment, which includes the numerical control device 2 as described above, it is possible to achieve similar workings and effects as those described above.

Note that the present disclosure is not limited to the embodiment described above. However, the present disclosure may be changed and modified in a wide variety of ways.

For example, in the embodiment described above, the payload information storage unit 21 that stores pieces of payload information including the weight of a payload, the position of the center of gravity of the payload, and inertia of the payload, for example, is provided in a numerical control device. However, the present disclosure is not limited to have such a configuration. A payload information storage unit that stores pieces of payload information including those described above may be provided in the robot control device 3 or an external device, for example.

EXPLANATION OF REFERENCE NUMERALS

1: Numerical control system
2: Numerical control device
3: Robot control device
20: Machine tool
21: Payload information storage unit
22: Program input unit
23: Analysis unit
24: Payload setting selection unit
25: Robot instruction signal generation unit
26: Data transmission/reception unit (transmission unit)
30: Robot
31: Storage unit
32: Data transmission/reception unit (reception unit)
33: Analysis unit
34: Robot command generation unit
35: Program management unit
36: Path control unit
37: Kinematics control unit
38: Payload setting update control unit
39: Inverse dynamics calculation unit
40: Servo control unit.

The invention claimed is:
1. A numerical control device comprising:
a first processor configured to analyze a robot numerical control instruction in a numerical control program;
a robot instruction signal generation circuit configured to generates a robot instruction signal to be transmitted to a robot control device in accordance with the robot numerical control instruction analyzed by the first processor;
the first processor configured to select a payload setting to be set for a robot from among a plurality of payload settings in accordance with the robot numerical control instruction analyzed, wherein a payload setting among the plurality of payload settings corresponds to a group among a plurality of group numbers, and
the first processor is further configured to:
select a group number corresponding to a G-code included in the robot numerical control instruction from among the plurality of group numbers; and
select the payload setting to be set for the robot from among the plurality of payload settings based on the group number corresponding to the G-code included in the robot numerical control instruction; and
a first communication interface configured to transmit the payload setting selected by the first processor to the robot control device via the robot instruction signal generation circuit and thereby provide the payload setting to facilitate an inverse dynamics calculation for torque to be inputted into the robot.

2. The numerical control device according to claim 1, wherein each of the plurality of payload settings is related to a weight of a payload, a position of a center of gravity of the payload, and inertia of the payload.

3. The numerical control device according to claim 1, wherein the payload setting is set in accordance with a workpiece.

4. The numerical control device according to claim 1, wherein the payload setting is set in accordance with a workpiece pre-machined and post-machined.

5. A numerical control system comprising:

the numerical control device according to claim 1; and the robot control device, wherein the robot control device includes:

a second communication interface configured to receive the payload setting transmitted from the first communication interface;

a second processor configured to:

performs an update with the payload setting received; and performs an inverse dynamics calculation to calculate torque to be inputted into the robot based on the payload setting updated.

\* \* \* \* \*